(12) United States Patent
Hwang

(10) Patent No.: US 10,773,195 B2
(45) Date of Patent: Sep. 15, 2020

(54) SPINNING NOZZLE MEMBER FOR MANUFACTURING CYLINDRICAL CARTRIDGE CARBON FILTER, CYLINDRICAL CARTRIDGE CARBON FILTER MANUFACTURING APPARATUS INCLUDING SPINNING NOZZLE MEMBER FOR MANUFACTURING CYLINDRICAL CARTRIDGE CARBON FILTER, AND CYLINDRICAL CARTRIDGE CARBON FILTER MANUFACTURED BY USING SPINNING NOZZLE MEMBER FOR MANUFACTURING CYLINDRICAL CARTRIDGE CARBON FILTER

(71) Applicant: S&S Filtech. CO., LTD, Hwaseong-si (KR)

(72) Inventor: Doo Sung Hwang, Seoul (KR)

(73) Assignee: S&S FILTECH.CO., LTD, Hwaseong-si (KR)

( * ) Notice: Subject to any disclaimer, the term of this patent is extended or adjusted under 35 U.S.C. 154(b) by 204 days.

(21) Appl. No.: 15/779,832

(22) PCT Filed: Nov. 30, 2016

(86) PCT No.: PCT/KR2016/013943
§ 371 (c)(1),
(2) Date: May 29, 2018

(87) PCT Pub. No.: WO2017/116018
PCT Pub. Date: Jul. 6, 2017

(65) Prior Publication Data
US 2018/0345191 A1    Dec. 6, 2018

(30) Foreign Application Priority Data

Dec. 30, 2015  (KR) .................. 10-2015-0189258
Oct. 18, 2016  (KR) .................. 10-2016-0135220

(51) Int. Cl.
*B01D 39/14*      (2006.01)
*D01D 4/02*       (2006.01)
(Continued)

(52) U.S. Cl.
CPC ......... *B01D 46/0001* (2013.01); *B01D 35/00* (2013.01); *B01D 39/1623* (2013.01);
(Continued)

(58) Field of Classification Search
CPC ............ B01D 39/1623; B01D 39/2065; B01D 39/2089; B01D 29/111; B01D 35/00;
(Continued)

(56) References Cited

U.S. PATENT DOCUMENTS 3,251,475 A  *  5/1966  Till ...................... B01D 25/001
                                                        210/508
3,816,304 A  *  6/1974  Wallis .................. B01D 29/216
                                                        210/777
(Continued)

FOREIGN PATENT DOCUMENTS

CN        1235898        11/1999
CN        1290569 A       4/2001
(Continued)

*Primary Examiner* — Frank M Lawrence, Jr.

(57) ABSTRACT

The disclosed spinning nozzle member for manufacturing a cylindrical cartridge carbon filter comprises a nozzle body, a synthetic resin spinning part, a flowing air providing part, and a carbon spinning part, thereby enabling the cylindrical cartridge carbon filter to be continuously produced since a separate operation for filling a space between a core and an outer cover with carbon after the core and the outer cover are separately formed is not required.

5 Claims, 9 Drawing Sheets

(51) Int. Cl.
- *B01D 46/00* (2006.01)
- *B01D 39/16* (2006.01)
- *B01D 39/20* (2006.01)
- *D01D 11/00* (2006.01)
- *D04H 1/407* (2012.01)
- *B01D 35/00* (2006.01)
- *B01D 46/24* (2006.01)
- *B01D 29/11* (2006.01)

(52) U.S. Cl.
CPC ..... *B01D 39/2065* (2013.01); *B01D 39/2089* (2013.01); *B01D 46/002* (2013.01); *B01D 46/0056* (2013.01); *B01D 46/2411* (2013.01); *D01D 4/025* (2013.01); *D01D 11/00* (2013.01); *D04H 1/407* (2013.01); *B01D 29/111* (2013.01); *B01D 2253/102* (2013.01); *B01D 2265/06* (2013.01); *B01D 2273/30* (2013.01)

(58) Field of Classification Search
CPC .............. B01D 46/0001; B01D 46/002; B01D 46/0056; B01D 46/2411; B01D 46/0023; B01D 2253/102; B01D 2265/06; B01D 2273/30; D01D 11/00; D01D 4/025; D04H 1/407; D04H 1/724
USPC ...................................... 55/498; 96/134, 135
See application file for complete search history.

(56) References Cited

U.S. PATENT DOCUMENTS

| | | | | |
|---|---|---|---|---|
| 3,971,373 | A * | 7/1976 | Braun | D04H 1/407 128/206.19 |
| 5,149,468 | A | 9/1992 | Hershelman | |
| 6,703,072 | B2 * | 3/2004 | Fu | B01J 20/04 427/201 |
| 7,087,129 | B2 * | 8/2006 | Morgan | B01D 39/1623 156/167 |
| 2001/0035094 | A1 * | 11/2001 | Takagaki | B01D 46/0001 96/154 |
| 2005/0284298 | A1 * | 12/2005 | Hirata | B01D 53/0415 96/134 |
| 2007/0251876 | A1 | 11/2007 | Krogue et al. | |
| 2008/0318024 | A1 * | 12/2008 | Angadjivand | D04H 5/08 428/311.51 |
| 2010/0291213 | A1 * | 11/2010 | Berrigan | D04H 1/42 424/484 |
| 2014/0265019 | A1 | 9/2014 | Liao | |
| 2017/0137970 | A1 * | 5/2017 | Pourdeyhimi | D04H 1/4382 |

FOREIGN PATENT DOCUMENTS

| | | |
|---|---|---|
| JP | 2010-234211 A | 10/2010 |
| KR | 10-2003-0039125 | 5/2003 |
| KR | 10-2013-0130271 | 12/2013 |
| KR | 1020130094196 | 8/2018 |
| TW | 442393 | 6/2001 |
| TW | 201519943 A | 6/2015 |
| TW | I487560 | 6/2015 |

\* cited by examiner

SPINNING NOZZLE MEMBER FOR MANUFACTURING CYLINDRICAL CARTRIDGE CARBON FILTER, CYLINDRICAL CARTRIDGE CARBON FILTER MANUFACTURING APPARATUS INCLUDING SPINNING NOZZLE MEMBER FOR MANUFACTURING CYLINDRICAL CARTRIDGE CARBON FILTER, AND CYLINDRICAL CARTRIDGE CARBON FILTER MANUFACTURED BY USING SPINNING NOZZLE MEMBER FOR MANUFACTURING CYLINDRICAL CARTRIDGE CARBON FILTER

TECHNICAL FIELD

The present disclosure relates to a spinning nozzle member for manufacturing a cylindrical cartridge carbon filter, a cylindrical cartridge carbon filter manufacturing apparatus including the spinning nozzle member for manufacturing a cylindrical cartridge carbon filter, and a cylindrical cartridge carbon filter manufactured using the spinning nozzle member for manufacturing a cylindrical cartridge carbon filter.

BACKGROUND ART

A cylindrical cartridge carbon filter is commonly used to remove foreign objects, such as dust, from a substance to be filtered, such as water or air, and is formed to have a cylindrical shape.

Such a cylindrical cartridge carbon filter may be manufactured by a method of manufacturing a cylindrical depth filter having improved filtration performance such as that disclosed in Korean Patent No. 10-0602164 (titled "METHOD OF MANUFACTURING CYLINDRICAL DEPTH FILTER HAVING IMPROVED FILTRATION PERFORMANCE") described below. A spinning nozzle assembly for manufacturing a cylindrical cartridge filter such as that disclosed in Korean Patent No. 10-0572045 (titled "SPINNING NOZZLE ASSEMBLY FOR MANUFACTURING CYLINDRICAL CARTRIDGE FILTER") may be applied in the method.

However, a conventional spinning nozzle member for manufacturing a cylindrical cartridge carbon filter uses a method of simply melting a synthetic resin and spinning the melted synthetic resin. Thus, when carbon is added to the melted synthetic resin to improve foreign object filtering performance, after a core and an outer cover are respectively and independently formed by such a spinning method, there is no choice but to place the core inside the outer cover, and then, to fill a space between the outer cover and the core with carbon. Thus, there are limitations, in that a cylindrical cartridge carbon filter is impossible to continuously manufacture and manufacturing efficiency of the cylindrical cartridge carbon filter is thus relatively low.

DISCLOSURE

Technical Problem

Accordingly, the present disclosure has been made in consideration of the above-described problems occurring in the related art, and the present disclosure proposes a spinning nozzle member for manufacturing a cylindrical cartridge carbon filter, a cylindrical cartridge carbon filter manufacturing apparatus including the spinning nozzle member for manufacturing a cylindrical cartridge carbon filter, and a cylindrical cartridge carbon filter manufactured using the spinning nozzle member for manufacturing a cylindrical cartridge carbon filter.

Technical Solution

According to an aspect of the present disclosure, a spinning nozzle member for manufacturing a cylindrical cartridge carbon filter includes: a nozzle body; a synthetic resin spinning part formed to penetrate the nozzle body and ejecting a synthetic resin; a flowing air providing part providing flowing air such that the synthetic resin ejected from the synthetic resin spinning part is ejected outside of the nozzle body; and a carbon spinning part ejecting carbon mixable with the synthetic resin ejected from the synthetic resin spinning part and ejected outside of the nozzle body in a state of being carried on the flowing air provided by the flowing air providing part.

According to an aspect of the present disclosure, a cylindrical cartridge carbon filter manufacturing apparatus includes: a spinning nozzle member for manufacturing a cylindrical cartridge carbon filter, able to eject at least one of a synthetic resin and carbon; and a filter forming roller rotated such that the at least one of the synthetic resin and the carbon ejected from the spinning nozzle member is attached to a surface thereof, and allowing the cylindrical cartridge carbon filter to be formed on an outer peripheral surface thereof.

According to an aspect of the present disclosure, a cylindrical cartridge carbon filter is manufactured using a spinning nozzle member for manufacturing a cylindrical cartridge carbon filter, including a nozzle body, a synthetic resin spinning part formed to penetrate the nozzle body and ejecting a synthetic resin, a flowing air providing part providing flowing air such that the synthetic resin ejected from the synthetic resin spinning part is ejected outside of the nozzle body, and a carbon spinning part ejecting carbon mixable with the synthetic resin ejected from the synthetic resin spinning part and ejected outside of the nozzle body in a state of being carried on the flowing air provided by the flowing air providing part.

The cylindrical cartridge carbon filter includes: a core formed from the synthetic resin ejected from the synthetic resin spinning part; a carbon filtering portion formed by mixing the synthetic resin and the carbon respectively ejected from the synthetic resin spinning part and the carbon spinning part and attaching a mixture of the synthetic resin and the carbon to an outer surface of the core in a shape surrounding the core; and an outer cover formed by attaching the synthetic resin ejected from the synthetic resin spinning part to an outer surface of the carbon filtering portion in a shape surrounding the carbon filtering portion.

Advantageous Effects

As set forth above, according to a spinning nozzle member for manufacturing a cylindrical cartridge carbon filter, a cylindrical cartridge carbon filter manufacturing apparatus including the spinning nozzle member for manufacturing a cylindrical cartridge carbon filter, and a cylindrical cartridge carbon filter manufactured using the spinning nozzle member for manufacturing a cylindrical cartridge carbon filter according to an aspect to the present disclosure, since the cylindrical cartridge carbon filter manufacturing apparatus includes the spinning nozzle member for manufacturing a cylindrical cartridge carbon filter and the filter forming roller, a separate operation of individually forming a core

BEST MODE

Hereinafter, a spinning nozzle member for manufacturing a cylindrical cartridge carbon filter, a cylindrical cartridge carbon filter manufacturing apparatus including the spinning nozzle member for manufacturing a cylindrical cartridge carbon filter, and a cylindrical cartridge carbon filter manufactured using the spinning nozzle member for manufacturing a cylindrical cartridge carbon filter according to embodiments of the present disclosure will be described with reference to the accompanying drawings.

Figure 1:
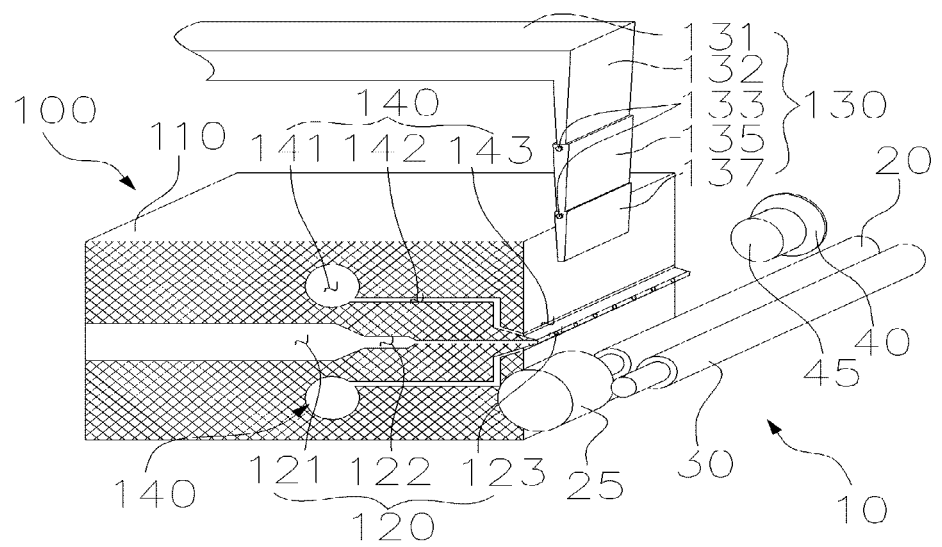
FIG. 1 is a schematic view illustrating a cylindrical cartridge carbon filter manufacturing apparatus including a spinning nozzle member for manufacturing a cylindrical cartridge carbon filter, according to a first embodiment of the present disclosure.
Figure 2:
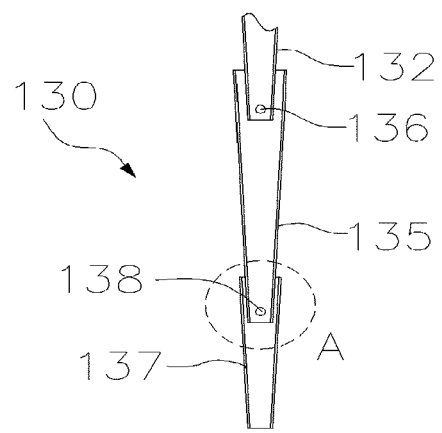
FIG. 2 is a cross-sectional view illustrating a carbon spinning part constituting a spinning nozzle member for manufacturing a cylindrical cartridge carbon filter, according to the first embodiment of the present disclosure.
Figure 3:
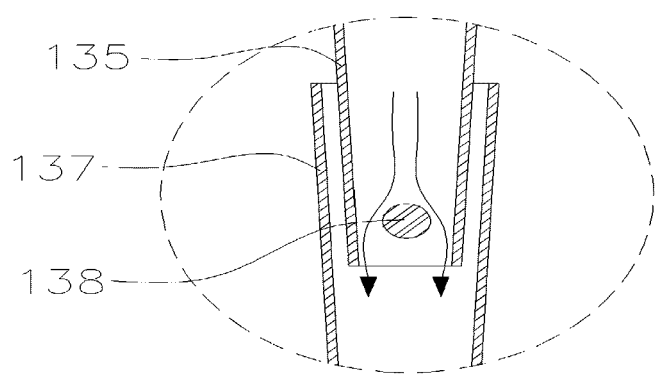
FIG. 3 is an enlarged view of a portion A of FIG. 2 illustrating a flow of carbon.
Figure 4:
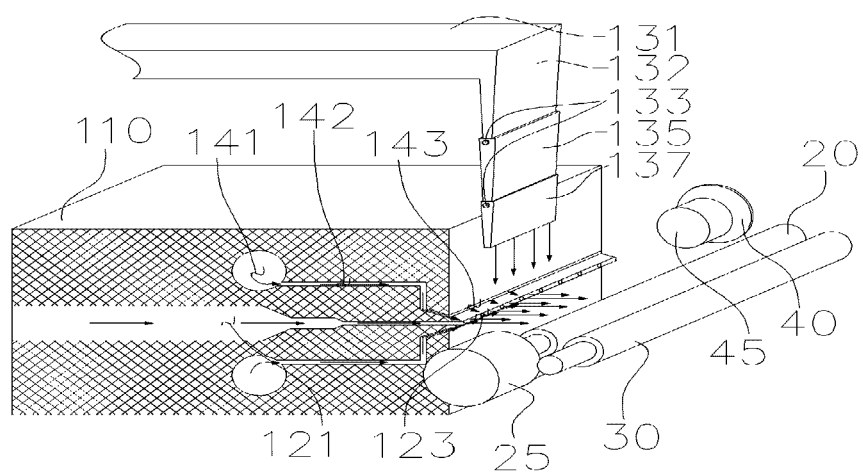
FIG. 4 is a cross-sectional view illustrating a state in which a synthetic resin and carbon are ejected together in the cylindrical cartridge carbon filter manufacturing apparatus according to the first embodiment of the present disclosure.
Figure 5:
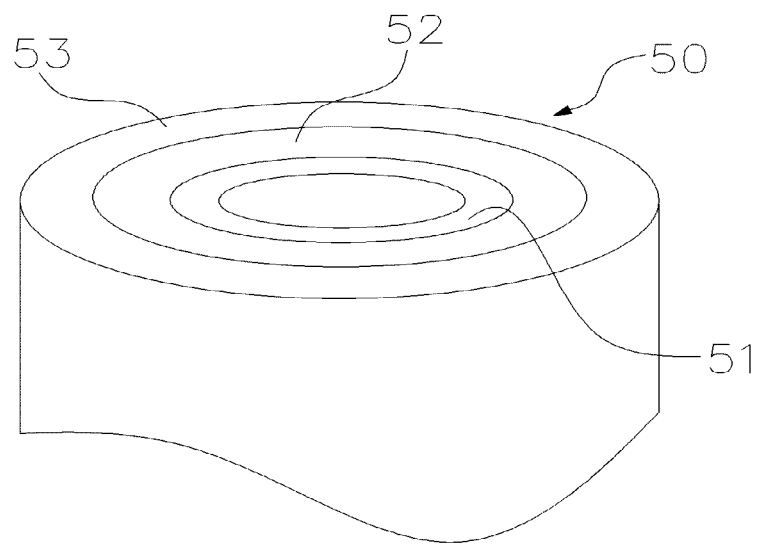
FIG. 5 is a perspective view illustrating a cylindrical cartridge carbon filter manufactured by the cylindrical cartridge carbon filter manufacturing apparatus according to the first embodiment of the present disclosure.

FIG. 1 is a schematic view illustrating a cylindrical cartridge carbon filter manufacturing apparatus including a spinning nozzle member for manufacturing a cylindrical cartridge carbon filter, according to a first embodiment of the present disclosure, FIG. 2 is a cross-sectional view illustrating a carbon spinning part constituting a spinning nozzle member for manufacturing a cylindrical cartridge carbon filter, according to a first embodiment of the present disclosure, FIG. 3 is an enlarged view of a portion A of FIG. 2 illustrating a flow of carbon, FIG. 4 is a cross-sectional view illustrating a state in which a synthetic resin and carbon are ejected together in the cylindrical cartridge carbon filter manufacturing apparatus according to the first embodiment of the present disclosure, and FIG. 5 is a perspective view illustrating a cylindrical cartridge carbon filter manufacture by the cylindrical cartridge carbon filter manufacturing apparatus according to the first embodiment of the present disclosure.

Referring to FIGS. 1 to 5, a cylindrical cartridge carbon filter manufacturing apparatus 10 includes a spinning nozzle member 100 for manufacturing a cylindrical cartridge carbon filter and a filter forming roller 20.

The spinning nozzle member 100 for manufacturing a cylindrical cartridge carbon filter may eject at least one of a synthetic resin and carbon. The spinning nozzle member 100 for the cylindrical cartridge carbon filter according to the present embodiment includes a nozzle body 110, a synthetic resin spinning part 120, a carbon spinning part 130, and a flowing air providing part 140.

The filter forming roller 20 allows a cylindrical cartridge carbon filter 50 to be formed on an outer peripheral surface thereof by rotating such that at least one of a synthetic resin and carbon ejected from the spinning nozzle member 100 for manufacturing a cylindrical cartridge carbon filter is attached to the outer peripheral surface thereof The reference numeral 25 denotes a filter-forming-roller rotating and moving means that moves the filter forming roller 20 at a constant speed while continuously rotating the filter forming roller 20. The filter-forming-roller rotating and moving means 25 pushes the filter forming roller 20 at a constant speed while continuously rotating the filter forming roller 20 by using a combination of an electric motor and a hydropneumatic cylinder, wherein the electric motor continuously rotates the filter forming roller 20 at a constant speed and the hydropneumatic cylinder pushes the filter forming roller 20 at a constant speed.

The reference numeral 30 denotes a pressing roller 30 that presses and compacts at least one of the synthetic resin and the carbon attached to the outer peripheral surface of the filter forming roller 20 while rotating in a state of contacting the filter forming roller 20. An elastic member (not shown) such as a spring applies elastic force to the pressing roller 30 to allow the pressing roller 30 to elastically press a surface of the filter forming roller 20.

The reference numerical 40 denotes a cutting member such as a circular blade that cuts the cylindrical cartridge carbon filter 50 formed on the filter forming roller 20 into certain lengths. The reference numeral 45 denotes a cutting-member rotating means such as an electric motor that rotates the cutting member 40.

The nozzle body 110 may be formed from a metal material and may have a rectangular shape or the like formed lengthwise to have a certain length.

The synthetic resin spinning part 120 is formed to penetrate the nozzle body 110 and ejects a synthetic resin, for example, polypropylene (PP).

Specifically, the synthetic resin spinning part 120 includes a synthetic resin supply hole 121 through which a synthetic resin is supplied to the nozzle body 110 from the outside, a synthetic resin flow hole 122 through which the synthetic resin supplied through the synthetic resin supply hole 121 flows, and a synthetic resin spinning nozzle 123 through which the synthetic resin flowing through the synthetic resin flow hole 122 is ejected.

The synthetic resin supply hole 121 is a hole which is connected to an external synthetic resin supply means (not shown) and through which a synthetic resin supplied in a melted state from the external synthetic resin supply means is introduced.

The synthetic resin flow hole 122 is to allow the synthetic resin supply hole 121 and the synthetic resin spinning nozzle 123 to communicate with each other.

The synthetic resin spinning nozzle 123 is provided as a plurality of synthetic resin spinning nozzles spaced apart from each other in the nozzle body 110 and sprays the synthetic resin from a plurality of points.

The flowing air providing part 140 provides flowing air such that the synthetic resin ejected from the synthetic resin spinning part 120 is ejected outside of the nozzle body 110.

Specifically, the flowing air providing part 140 includes a flowing air supply hole 141 through which the flowing air is supplied to the nozzle body 110 from the outside, a flowing air flow hole 142 through which the flowing air supplied through the flowing air supply hole 141 flows, and a flowing air spinning nozzle 143 through which the flowing air flowing through the flowing air flow hole 142 is ejected.

The flowing air supply hole 141 is a hole which is connected to a flowing air supply means (not shown) such as an external hydropneumatic pump and through which flowing air supplied in a high pressure state from the flowing air supply means is introduced.

The flowing air flow hole 142 is to allow the flowing air supply hole 141 and the flowing air spinning nozzle 143 to communicate with each other.

The flowing air providing part 140 is provided as a pair of flowing air providing parts symmetrical to each other with respect to the synthetic resin spinning part 120 in the nozzle body 110 and ejects flowing air above and below the synthetic resin spinning nozzle 123.

That is, the synthetic resin spinning nozzles 123 protrude from the nozzle body 110 by a certain length, the flowing air spinning nozzles 143 are formed above and below the synthetic resin spinning nozzles 123, and the flowing air spinning nozzles 143 are inclined to converge toward the synthetic resin spinning nozzles 123. Accordingly, the flowing air ejected through the flowing air spinning nozzles 143 meets the synthetic resin ejected through the synthetic resin spinning nozzles 123 and moves toward the synthetic resin spinning nozzles 123 in the air while carrying the synthetic resin.

The carbon spinning part 130 may eject carbon mixable with the synthetic resin ejected from the synthetic resin spinning part 120 and ejected outside of the nozzle body 110 in a state of being carried on the flowing air provided by the flowing air providing part 140.

Specifically, the carbon spinning part 130 includes a carbon supply body 131 disposed outside of the nozzle body 110 independently from the nozzle body 110, in which the carbon is supplied from the outside through the carbon supply body 131, and a carbon spinning nozzle 137 detachably connected to the carbon supply body 131 and mixing the carbon supplied through the carbon supply body 130 with the synthetic resin ejected through the synthetic resin spinning nozzle 123.

The carbon supply body 131 becomes a path which is connected to an external carbon storage tank (not shown) storing carbon and through which carbon is supplied. The carbon supply body 131 is disposed above the nozzle body 110 to be spaced apart from the nozzle body 110, and includes a supply end portion 132 formed at an end portion thereof and bent toward the synthetic resin spinning nozzle 123.

The carbon spinning nozzle 137 may be directly detachably connected to the supply end portion 132 or may be indirectly detachably connected through a carbon speed adjustment body 135 to be described later.

The supply end portion 132, the carbon spinning nozzle 137, and the carbon speed adjustment body 135 are connected to each other via a connection means 133 such as a bolt to be detachable from each other.

The carbon spinning nozzle 137 has a cross section formed in a tapered shape in which a lower end thereof is relatively narrower than an upper end thereof. Thus, as carbon dropping through the carbon spinning nozzle 137 are gradually concentrated toward the relatively narrow lower end, the carbon can be decelerated.

In the present embodiment, the carbon spinning part 130 further includes a nozzle carbon collision bar 138 disposed to traverse the carbon spinning nozzle 137 and adjusting an ejection speed of carbon from the carbon spinning part 130 by allowing carbon supplied through the carbon supply body 131 to drop through the carbon spinning nozzle 137 to collide therewith. Thus, the carbon supplied through the carbon supply body 131 to drop through the carbon spinning nozzle 137 can be decelerated while colliding with the nozzle carbon collision bar 138.

The nozzle carbon collision bar 138 may be formed in a long bar shape having a circular cross section.

In addition, the carbon spinning part 130 includes a carbon speed adjustment body 135 detachably connected between the carbon supply body 131 and the carbon spinning nozzle 137 and allowing carbon supplied through the carbon supply body 131 to drop through the carbon spinning nozzle 137 via the carbon speed adjustment body 135, and an adjustment body carbon collision bar 136 disposed to traverse the carbon speed adjustment body 135 and adjusting an ejection speed of carbon from the carbon spinning part 130 by allowing carbon supplied through the carbon supply body 131 to drop through the carbon spinning nozzle 137 to collide therewith.

The adjustment body carbon collision bar 136 may be formed in a long bar shape having a circular cross section.

The carbon speed adjustment body 135 has a cross section formed in a tapered shape in which a lower end thereof is relatively narrower than an upper end thereof. Thus, as carbon dropping through the carbon speed adjustment body 135 are gradually concentrated toward the relatively narrow lower end, the carbon can be decelerated.

As described above, carbon dropping from the carbon supply body 131 can be decelerated due to the tapered shapes of the carbon speed adjustment body 135 and the carbon spinning nozzle 137. In addition, during the dropping, carbon can be sequentially decelerated while colliding with the adjustment body carbon collision bar 136 and the nozzle carbon collision bar 138. Thus, carbon can be smoothly supplied at a relatively rapid speed through the carbon supply body 131, and a speed of carbon ejected through the carbon spinning nozzle 137 can be relatively reduced, so that carbon dropping through the carbon spinning nozzle 137 can be transferred toward the filter forming roller 20 in a state of being smoothly carried on the flowing air ejected through the flowing air spinning nozzle 143 and being well mixed with the synthetic resin ejected through the synthetic resin spinning nozzle 123.

When carbon is ejected through the carbon spinning nozzle 137 at a rapid speed as in the carbon supply body 131, carbon drops in a state of being not smoothly carried on the flowing air. Thus, there may be a problem that the carbon is not smoothly mixed with the synthetic resin carried on the flowing air. In the present embodiment, the problem can be prevented through the structure described above.

Due to the structure described above, while the synthetic resin ejected outside of the nozzle body 110 through the synthetic resin spinning nozzle 123 is blown by the flowing air ejected through the flowing air spinning nozzle 143, the carbon can be mixed with the synthetic resin blown by the flowing air while being ejected through the carbon spinning nozzle 137.

The synthetic resin spinning nozzles 123 and the flowing air spinning nozzles 143 are arranged in a long line in a left and right direction of the nozzle body 110, i.e. in a direction in which the filter forming roller 20 is moved by the filter-forming-roller rotating and moving means 25. The carbon spinning nozzles 137 are arranged in a middle section of sections in which the synthetic resin spinning nozzles 123 and the flowing air spinning nozzles 143 are arranged. While the filter forming roller 20 is rotated and gradually moved by the filter-forming-roller rotating and moving means 25, only a synthetic resin may be ejected on the filter forming roller 20 to form a core 51 described layer in an initial section in which the synthetic resin spinning nozzles 123 and the flowing air spinning nozzles 143 are only arranged. When the film forming roller 20, on which the core 51 is formed, is moved to enter the middle section in which all of the synthetic resin spinning nozzles 123, the flowing air spinning nozzles 143, and the carbon spinning nozzles 137 are arranged, a synthetic resin and carbon may be ejected together on the carbon forming roller 20 to form a carbon filtering portion 52 to be described later. The filter forming roller 20, on which the carbon filtering portion 52 is formed, gets out of the middle section in which the carbon spinning nozzles 137 are arranged and enters a final section in which the synthetic resin spinning nozzles 123 and the flowing air spinning nozzles 143 are only arranged, a synthetic resin may be ejected on the filter forming roller 20 to form an outer cover 53 to be described later. Next, cutting may be performed by the cutting member 40, so that the cylindrical cartridge carbon filter 50 may be automatically and continuously manufactured.

The cylindrical cartridge carbon filter 50 according to the present embodiment is manufactured using the spinning nozzle member 100 for manufacturing a cylindrical cartridge carbon filter. The spinning nozzle member 100 includes the nozzle body 110; the synthetic resin spinning part 120 formed to penetrate the nozzle body 110 and ejecting a synthetic resin; the flowing air providing part 140 providing flowing air such that the synthetic resin ejected from the synthetic resin spinning part 120 are ejected outside of the nozzle body 110; and the carbon spinning part 130 ejecting carbon mixable with the synthetic resin ejected from the synthetic resin spinning part 120 and ejected outside of the nozzle body 110 in a state of being carried on the flowing air provided by the flowing air providing part 140. The cylindrical cartridge carbon filter 50 includes the core 51 formed from the synthetic resin ejected from the synthetic resin spinning part 120; the carbon filtering portion 52 formed by mixing the synthetic resin and the carbon respectively ejected from the synthetic resin spinning part 120 and the carbon spinning part 130, and attaching a mixture of the synthetic resin and the carbon to an outer surface of the core 51 in a shape surrounding the core 51; and the outer cover 53 formed by attaching the synthetic resin ejected from the synthetic resin spinning part 120 to an outer surface of the carbon filtering portion 52 in a shape surrounding the core 51.

Hereinafter, an operation of the cylindrical cartridge carbon filter manufacturing apparatus 10 according to the present embodiment will be described.

First, when the filter forming roller 20 is rotated and moved by the filter-forming-roller rotating and moving means 25, the filter forming roller 20 primarily enters the initial section in which the synthetic resin spinning nozzles 123 and the flowing air spinning nozzles 143 are only arranged, and in the initial section, only a synthetic resin is ejected on the filter forming roller 20 to form the core 51 on the filter forming roller 20.

Next, when the filter forming roller 20 is continuously rotated and moved, the film forming roller 20, on which the core 51 is formed, secondarily enters the middle section in which all of the synthetic resin spinning nozzles 123, the flowing air spinning nozzles 143, and the carbon spinning nozzles 137 are arranged, and in the middle section, a synthetic resin and carbon may be ejected together on the film forming roller 20 to form the carbon filtering portion 52 on the film forming roller 20.

After that, when the filter forming roller 20 is continuously rotated and moved, the filter forming roller 20, on which the carbon filtering portion 52 is formed, gets out of the middle section in which the carbon spinning nozzles 137 are arranged and thirdly enters the final section in which the synthetic resin spinning nozzles 123 and the flowing air spinning nozzles 143 are only arranged, and in the final section, a synthetic resin may be ejected on the filter forming roller 20 to form the outer cover 53 on the filter forming roller 20.

Finally, cutting may be performed by the cutting member 40, so that the cylindrical cartridge carbon filter 50 may be automatically and continuously manufactured.

Here, the synthetic resin spinning nozzles 123, the flowing air spinning nozzles 143, and the carbon spinning nozzles 137 may continuously eject a synthetic resin, flowing air, and carbon, respectively, so that the cylindrical cartridge carbon filter 50 may be continuously manufactured.

As described above, since the cylindrical cartridge carbon filter manufacturing apparatus 10 includes the spinning nozzle member 100 for manufacturing a cylindrical cartridge carbon filter and the filter forming roller 20, a separate operation of individually forming a core and an outer cover and then filling a space between the core and the outer cover with carbon is not required, thereby allowing the cylindrical cartridge carbon filter 50 to be continuously manufactured.

Mode for Invention

Hereinafter, a spinning nozzle member for manufacturing a cylindrical cartridge carbon filter, a cylindrical cartridge carbon filter manufacturing apparatus including the spinning nozzle member for manufacturing a cylindrical cartridge carbon filter, and a cylindrical cartridge carbon filter manufactured using the spinning nozzle member for manufacturing a cylindrical cartridge carbon filter according to other embodiments of the present disclosure will be described with reference to the accompanying drawings. In the following description, description of the configuration corresponding to that described in the first embodiment is replaced by it and is not provided.

Figure 6:
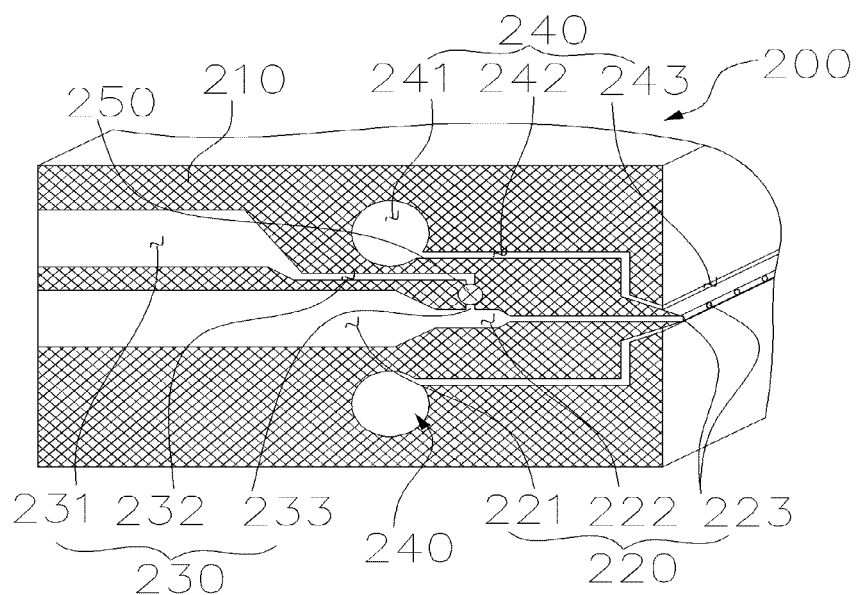
FIG. 6 is a cross-sectional view illustrating a spinning nozzle member for manufacturing a cylindrical cartridge carbon filter, according to a second embodiment of the present disclosure.
Figure 7:
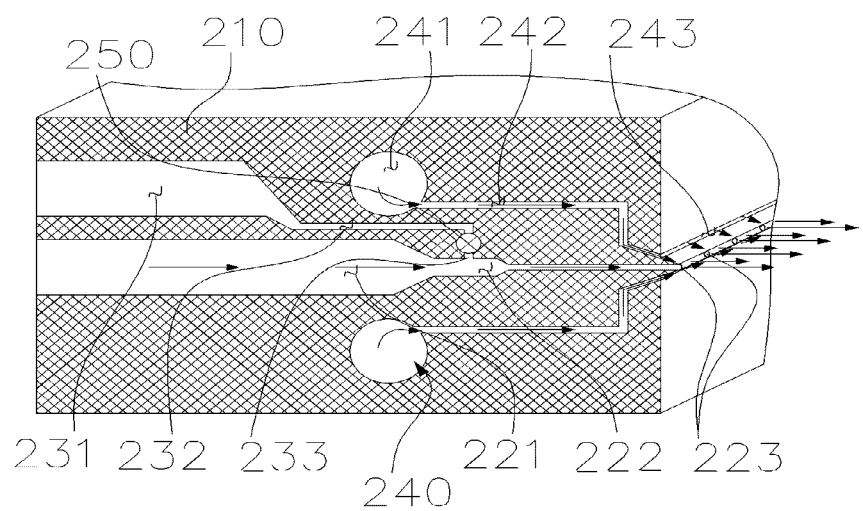
FIG. 7 is a cross-sectional view illustrating a state in which a synthetic resin is ejected from the spinning nozzle member for manufacturing a cylindrical cartridge carbon filter, according to the second embodiment of the present disclosure.
Figure 8:
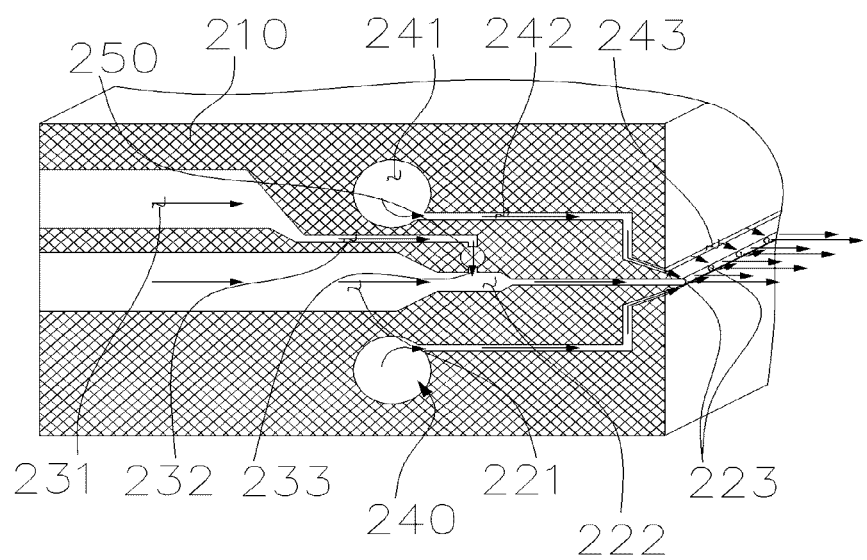
FIG. 8 is a cross-sectional view illustrating a state in which a synthetic resin and carbon are ejected together from the spinning nozzle member for manufacturing a cylindrical cartridge carbon filter, according to the second embodiment of the present disclosure.

FIG. 6 is a cross-sectional view illustrating a spinning nozzle member for manufacturing a cylindrical cartridge carbon filter, according to a second embodiment of the present disclosure, FIG. 7 is a cross-sectional view illustrating a state in which a synthetic resin is ejected from the spinning nozzle member for manufacturing a cylindrical cartridge carbon filter, according to the second embodiment of the present disclosure, and FIG. 8 is a cross-sectional view illustrating a state in which a synthetic resin and carbon are ejected together from the spinning nozzle member for manufacturing a cylindrical cartridge carbon filter, according to the second embodiment of the present disclosure.

Referring to FIGS. 6 to 8, a spinning nozzle member 200 for manufacturing a cylindrical cartridge carbon filter is characterized in that a synthetic resin spinning part 220 and a carbon spinning part 230 are formed to penetrate a nozzle body 200 together.

The carbon spinning part 230 includes a carbon supply hole 231 through which carbon is supplied to the nozzle body 210, a carbon flow hole 232 through which the carbon supplied through the carbon supply hole 231 flows, and a carbon spinning nozzle 233 through which the carbon flowing through the carbon flow hole 232 is ejected.

The carbon supply hole 231 is a hole which is connected to an external carbon storage tank and through which carbon supplied in a melted state from the external carbon storage tank is introduced.

The carbon flow hole 232 is to allow the carbon supply hole 231 and the carbon spinning nozzle 233 to communicate with each other.

The reference numeral 250 denotes a carbon opening and closing valve that is able to open and close the carbon spinning part 230, specifically, the carbon spinning nozzle 233. When the carbon opening and closing valve 250 is open, carbon is ejected through the carbon spinning nozzle 233, and when the carbon opening and closing valve 250 is closed, carbon is not ejected through the carbon spinning nozzle 233.

In the present embodiment, the carbon spinning nozzle 233 is connected to at least one of a synthetic resin supply hole 221 and a synthetic resin flow hole 222. For convenience of description, it is considered that the carbon spinning nozzle 233 is connected to the synthetic resin flow hole 22. In this case, carbon ejected through the spinning nozzle 233 is mixed with a synthetic resin flowing through the synthetic resin flow hole 222 and then flows toward the synthetic resin spinning nozzle 223.

Due to the structure described above, the carbon ejected through the spinning nozzle 233 is mixed with the synthetic resin, and then, a mixture of the carbon and the synthetic resin may be ejected to the outside through the synthetic resin spinning nozzle 223 while being blown by flowing air ejected through a flowing air spinning nozzle 243.

Here, when the synthetic resin is ejected through the synthetic resin spinning part 220 in a state in which the carbon opening and closing valve 250 is closed, a core 51 may be formed on a filter forming roller 20. Next, as the carbon opening and closing valve 250 is open, a synthetic resin and carbon may be ejected together to form a carbon filtering portion 52 on an outer surface of the core 51. After that, as the carbon opening and closing valve 250 is closed, only a synthetic resin may be ejected to form an outer cover 53 on an outer surface of the carbon filtering portion 52.

Figure 9:
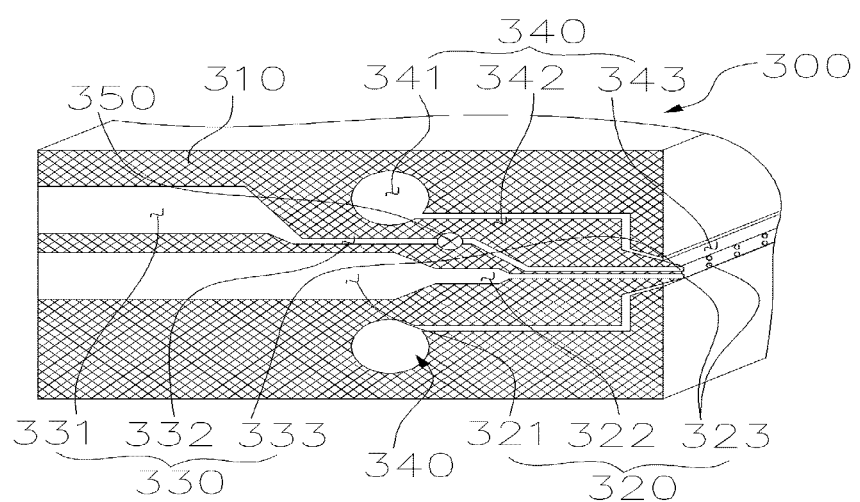
FIG. 9 is a cross-sectional view illustrating a spinning nozzle member for manufacturing a cylindrical cartridge carbon filter, according to a third embodiment of the present disclosure.

FIG. 9 is a cross-sectional view illustrating a spinning nozzle member for manufacturing a cylindrical cartridge carbon filter, according to a third embodiment of the present disclosure.

Referring to FIG. 9, since a spinning nozzle member 300 for manufacturing a cylindrical cartridge carbon filter according to the present embodiment is the same as the spinning nozzle member 200 for manufacturing a cylindrical cartridge carbon filter according to the second embodiment except for the following description, redundant descriptions thereof will be substituted with that of the second exemplary embodiment.

In the present embodiment, since a carbon spinning nozzle 333 is disposed parallel to a synthetic resin spinning nozzle 323, carbon reaching the carbon spinning nozzle 333 and a synthetic resin reaching the synthetic resin spinning nozzle 323 may be respectively ejected to the outside through the carbon spinning nozzle 333 and the synthetic resin spinning nozzle 323 and may be mixed in the outside while being blown by flowing air ejected through a flowing air spinning nozzle 343.

While the present disclosure has been illustrated and described with respect to the specific exemplary embodiments, it will be apparent to a person having ordinary skill in the art that many modifications and variations are possible without departing from spirits and scopes of the present disclosure defined by appended claims. It is definitely noted that such modifications and variations are included within the scope of the present disclosure.

INDUSTRIAL APPLICABILITY

According to a spinning nozzle member for manufacturing a cylindrical cartridge carbon filter, a cylindrical cartridge carbon filter manufacturing apparatus including the spinning nozzle member for manufacturing a cylindrical cartridge carbon filter, and a cylindrical cartridge carbon filter manufactured using the spinning nozzle member for manufacturing a cylindrical cartridge carbon filter according to an aspect to the present disclosure, the cylindrical cartridge carbon filter can be continuously manufactured, and thus, industrial applicability is high.

The invention claimed is:

1. A spinning nozzle member for manufacturing a cylindrical cartridge carbon filter, the spinning nozzle member comprising:
   a nozzle body;
   a synthetic resin spinning part formed to penetrate the nozzle body and to eject a synthetic resin, said synthetic resin spinning part comprising (i) a synthetic resin supply hole through which the synthetic resin is supplied to the nozzle body from the outside and (ii) a synthetic resin spinning nozzle, said synthetic resin spinning nozzle being connected to the synthetic resin supply hole and being open to the outside of the nozzle body;
   a flowing air providing part, said flowing air providing part configured to provide flowing air such that the synthetic resin is ejected outside of the nozzle body, the flowing air providing part comprising (i) a flowing air supply hole through which the air is supplied to the nozzle body from the outside and (ii) a flowing air spinning nozzle through which the flowing air flowing through the flowing air flow hole is ejected; and
   a carbon spinning part, said carbon spinning part configured to eject carbon to be mixed with the synthetic resin outside the nozzle body in a state of being carried on the flowing air provided by the flowing air providing part, the carbon spinning part comprising (i) a carbon supply body separately disposed outside of the nozzle body and (ii) a carbon spinning nozzle, said carbon spinning nozzle detachably connected to the carbon supply body and configured to mix the carbon with the synthetic resin from the synthetic resin spinning nozzle,
   wherein the carbon spinning part further comprises a nozzle carbon collision bar, said nozzle carbon collision bar disposed to traverse the carbon spinning nozzle and configured to adjust an ejection speed of the carbon from the carbon spinning part by allowing the carbon to drop through the carbon spinning nozzle to collide therewith.

2. The spinning nozzle member of claim 1, wherein the carbon spinning part further comprises:
- a carbon speed adjustment body detachably connected between the carbon supply body and the carbon spinning nozzle and allowing the carbon supplied through the carbon supply body to drop through the carbon spinning nozzle via the carbon speed adjustment body; and
- an adjustment body carbon collision bar disposed to traverse the carbon speed adjustment body and adjusting the ejection speed of the carbon from the carbon spinning part by allowing the carbon supplied through the carbon supply body to drop through the carbon spinning nozzle to collide therewith.

3. A cylindrical cartridge carbon filter manufacturing apparatus comprising:
- a spinning nozzle member as defined in claim 1 for manufacturing a cylindrical cartridge carbon filter, said spinning nozzle member configured to eject at least one of a synthetic resin and carbon; and
- a filter forming roller, said filter forming roller configured to rotate such that the at least one of the synthetic resin and the carbon ejected from the spinning nozzle member is attached to a surface thereof, and allowing the cylindrical cartridge carbon filter to be formed on an outer peripheral surface thereof.

4. The spinning nozzle member of claim 1 wherein the synthetic resin spinning part further comprises a synthetic resin flow hole through which the synthetic resin supplied through the synthetic resin supply hole flows and the synthetic resin spinning nozzle is configured such that the synthetic resin flowing through the synthetic resin flow hole is ejected.

5. The spinning nozzle member of claim 1 wherein the flowing air providing part further comprises a flowing air flow hole through which the flowing air supplied through the flowing air supply hole flows and the flowing air spinning nozzle is configured such that the flowing air flowing through the flowing air flow hole is ejected.

* * * * *